(12) United States Patent
Tikhonov et al.

(10) Patent No.: US 11,040,879 B2
(45) Date of Patent: Jun. 22, 2021

(54) TECHNOLOGY OF IODINE EXTRACTING FROM FORMATION AND ASSOCIATED WATER OF OIL AND GAS FIELDS

(71) Applicants: Serguei Tikhonov, Bremen (DE); Lia Neumann, The Woodlands, TX (US)

(72) Inventors: Serguei Tikhonov, Bremen (DE); Lia Neumann, The Woodlands, TX (US); Yusub Ishangulyyev, Ashgabat (TM)

(73) Assignees: Serguei Tikhonov, Bremen (DE); Lia Neumann, The Woodlands, TX (US)

( * ) Notice: Subject to any disclaimer, the term of this patent is extended or adjusted under 35 U.S.C. 154(b) by 0 days.

(21) Appl. No.: 16/831,917

(22) Filed: Mar. 27, 2020

(65) Prior Publication Data

US 2021/0122633 A1 Apr. 29, 2021

Related U.S. Application Data

(62) Division of application No. 16/662,458, filed on Oct. 24, 2019.

(51) Int. Cl.
| | |
|---|---|
| *B01D 53/14* | (2006.01) |
| *C01B 7/14* | (2006.01) |
| *C02F 1/28* | (2006.01) |
| *C02F 1/52* | (2006.01) |
| *C02F 1/66* | (2006.01) |
| *C02F 1/76* | (2006.01) |
| *C02F 9/00* | (2006.01) |

(Continued)

(52) U.S. Cl.
CPC ............ *C01B 7/14* (2013.01); *B01D 53/1418* (2013.01); *C02F 9/00* (2013.01); *B01D 2251/304* (2013.01); *B01D 2251/604* (2013.01); *C02F 1/281* (2013.01); *C02F 1/66* (2013.01); *C02F 1/76* (2013.01); *C02F 2001/5218* (2013.01); *C02F 2101/12* (2013.01); *C02F 2103/10* (2013.01)

(58) Field of Classification Search
CPC .......... B01D 53/1418; B01D 2251/304; B01D 2251/604; C01B 7/14; C02F 9/00; C02F 2001/5218; C02F 2101/12; C02F 2103/10; C02F 1/281; C02F 1/66; C02F 1/76

See application file for complete search history.

(56) References Cited

U.S. PATENT DOCUMENTS

| | | |
|---|---|---|
| 2,143,222 A | 1/1939 | Heath |
| 2,945,746 A | 7/1960 | Shaw |

(Continued)

OTHER PUBLICATIONS

Gates et al., "Irrigation Practices, Water Consumption, & Return Flows in Colorado's Lower Arkansas River Valley," Colorado State University, p. 28, Jun. 2012. (Year: 2012).*

(Continued)

*Primary Examiner* — Lucas A Stelling
(74) *Attorney, Agent, or Firm* — Renner, Otto, Boisselle & Sklar, LLP

(57) ABSTRACT

The present invention relates to a reactor system for extracting iodine from an aqueous brine, including:
a water heater (2);
a tank for storing an oxidizing agent (6);
means for carrying out iodine oxidation (8);
a desorber (5);
an absorption column (15);
a crystallizer (19);
an iodine melting node (21); and
a sublimator (22).

11 Claims, 1 Drawing Sheet

(51) Int. Cl.
  *C02F 103/10* (2006.01)
  *C02F 101/12* (2006.01)

(56) References Cited

U.S. PATENT DOCUMENTS

| | | | | |
|---|---|---|---|---|
| 3,752,453 | A | * | 8/1973 | Doyne ............... B01J 19/30 261/94 |
| 4,007,221 | A | | 2/1977 | Urbach |
| 4,013,780 | A | | 3/1977 | Seth |
| 5,331,841 | A | * | 7/1994 | Beaver ............... B01J 19/02 73/40.7 |
| 8,496,815 | B2 | | 7/2013 | Brix et al. |
| 2008/0289972 | A1 | | 11/2008 | Pastacaldi |
| 2010/0119438 | A1 | | 5/2010 | Becker et al. |
| 2011/0110816 | A1 | | 5/2011 | Itzhak et al. |
| 2011/0110846 | A1 | * | 5/2011 | Schneider ............ C02F 1/4674 423/501 |
| 2017/0096346 | A1 | | 4/2017 | Breske et al. |

OTHER PUBLICATIONS

U.S. Department of Agriculture, "Irrigation Water Requirements," Part 623 National Engineering Handbook, Chapter 2, p. 2-2, Sep. 1993. (Year: 1993).*

Irrigation New Zealand, "New Zealand Irrigation Technical Glossary," p. 2, Jul. 2015. (Year: 2015).*

* cited by examiner

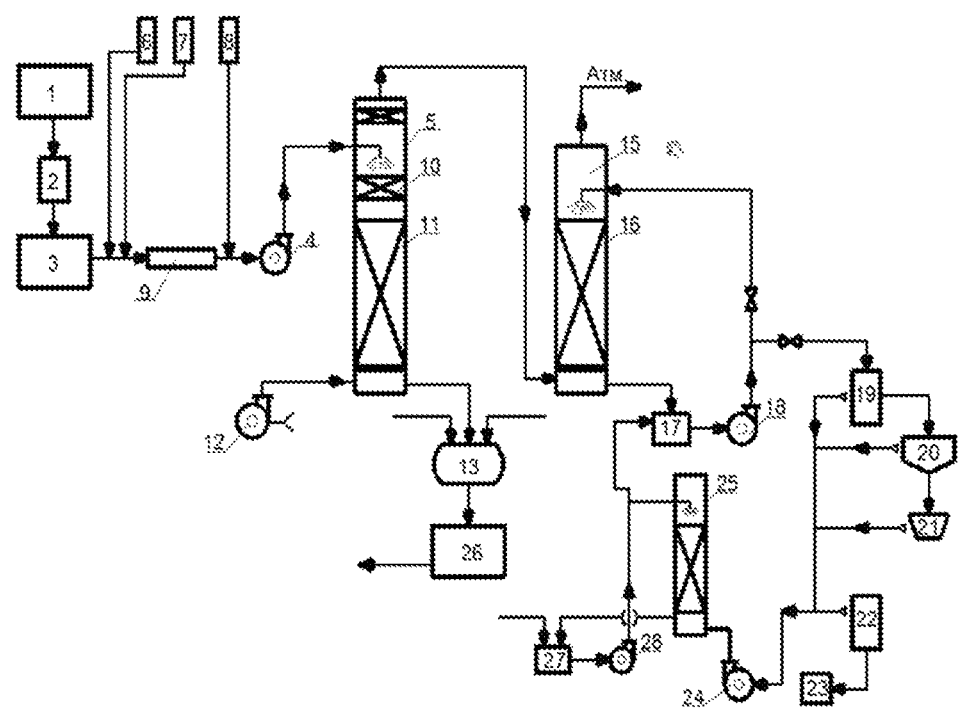

TECHNOLOGY OF IODINE EXTRACTING FROM FORMATION AND ASSOCIATED WATER OF OIL AND GAS FIELDS

CROSS-REFERENCE TO RELATED APPLICATION

The present application is a division of and claims priority under 35 U.S.C. § 120 to co-pending, commonly owned U.S. application Ser. No. 16/662,458, filed 24 Oct. 2019, the entirety of which is hereby incorporated herein by reference in its entirety.

TECHNICAL FIELD

The present invention is related to a method for extracting iodine from an aqueous brine.

BACKGROUND OF THE INVENTION

Elemental iodine or diatomic iodine ($I_2$) is a valuable chemical having many industrial and medicinal applications. There is an increasing demand for iodine and its major derivatives, iodide salts. The consumption of iodine and iodide salts is distributed among several industrial applications, such as catalysts, animal feed additives, stabilizers for nylon resins, inks and colorants, pharmaceuticals, disinfectants, film, and other uses. Much attention is therefore focused on the recovery of iodine from various sources, either as a primary product or as a by-product of other industrial processes.

Iodine has been isolated from gas well brine for a long time. The brine is pumped from a number of gas wells over many miles to a centralized processing facility. In that facility, the iodide rich brine is acidified and oxidized to obtain elemental iodine ($I_2$).

However, elemental iodine recovered in accordance with methods of the prior art often suffers from low purity and the yields of elemental iodine achieved by the methods of the prior art are rather poor.

It is therefore, the object of the present invention to provide a method for recovering (extraction) iodine overcoming drawbacks of the prior art, in particular allowing recovery of iodine, in particular from byproducts of industrial processes, allowing to recover the elemental iodine in improved yields and with improved purity.

DESCRIPTION OF THE INVENTION

The above object is achieved by the method for extracting iodine from an aqueous brine, the method comprising the steps:
  Providing an aqueous brine;
  Heating the aqueous brine;
  Adding an acid to the aqueous brine to arrive at a pH from 2 to 4;
  Adding an oxidizing agent to the aqueous brine to form iodine from iodide contained in the brine;
  Desorbing the iodine by means of an airflow;
  Adding a sorbent for chemisorbing the iodine;
  Crystallizing the iodine;
  Purifying the iodine under a layer of sulfuric acid;
  Sublimation of the iodine.

In accordance with the invention it is provided that the above steps of the inventive method are carried out in the given order, i.e. a step mentioned after a foregoing step is carried out thereafter and a step mentioned before a subsequent step is carried out before. Each of the following steps is performed on a mixture obtained in the foregoing step if not explicitly mentioned else. All of the above steps are essential for the invention. The different process steps are performed using suitable equipment allowing to carry out the steps. Exemplary respective equipment is described with respect to the preferred embodiments and the detailed embodiment shown in the FIGURES.

Providing the Aqueous Brine Containing Iodide Ions

The term "aqueous brine", as used herein, refers to any water-based solution of concentrated slurry of salt comprising iodide. Salts in aqueous brines consist chiefly of sodium chloride but may include other salts. Aqueous brines may be found naturally as in the example of Oklahoma gas-brine wells and re-injection oil wells. Naturally occurring aqueous brines may also occur in Japan and in California. Aqueous brines may also occur as sea water or concentrated seawater including seawater that occurs during or as a result of saltwater salination.

The aqueous brine may be formation water or associated waters from oil and gas fields.

In this regard, formation water may be water in the undisturbed zone around a borehole. Although formation water normally is the same as geological formation water, or interstitial water, it may be different because of the influx of injection water.

The step of providing the aqueous brine may comprise separating the aqueous brine from remaining oil particles and gas condensate.

The aqueous brine may comprise the iodide ions in an amount of at least 20 mg/l, alternatively 25 mg/l, alternatively 27 mg/l with respect to the total volume of the aqueous brine. In accordance with the present invention the higher iodine concentration of iodide-ions in aqueous brine is more preferable, in particular, from economic point of view, as higher iodide-ions content will lead to higher yield of iodine. In practice highest levels arise, if such aqueous brines, which are the result (byproduct) of other process, formation water, for example, are used. Then, highest level is limited by neutral or production process, which leads to creation of subsequent aqueous brine.

In the present application wherever it is referred to a "total amount", "total volume" etc. it is referred to the amount, the volume etc. which is contained in the respective part of the equipment necessary to carry out the respective step and not to the total amount, total volume etc. contained in the entire equipment necessary to carry out all of the steps.

The formation iodine-containing water, which may have passed a series of settling tanks, where it may be separated from remaining oil particles and gas condensate, may be fed to a clarifier, where chemical reagents, coagulating pollution, may be added.

Heating the Equation Brine Containing Iodide Ions

Heating the aqueous brine containing iodide ions may comprise heating to a temperature from 30 to 70° C., alternatively 40 to 60° C., alternatively 45 to 50° C.

The heating may be carried out using auxiliary heaters. Electric and/or gas heaters, in this respect, are more preferable.

The water, after being provided as mentioned above, may be fed to the auxiliary heaters, where it may be heated to a temperature of 45 to 50° C. and then may go to a horizontal cylindrical tank (sludge collector) which may be filled with a packing (which may be "nozzle-shaped" which may be a screw-like shape).

Adding an acid to the aqueous brine to arrive at a pH value from 2 to 4

The pH of the aqueous brine after adding the acid may be from 2.5 to 3.5.

The acid may be sulfuric acid and/or hydrochloric acid, where sulfuric acid is preferable (as it is cheaper).

Adding the acid may be performed in a horizontal cylindrical hollow unit filled with a packing.

In the presented variant of performance this packing can be screw polyethylene mixer.

Initial associated oil water may have bicarbonate alkalinity. It may contain organic and inorganic substances that make it difficult to extract iodine. Before the formation water is fed for desorption (blow down), it is acidified, for example with sulfuric acid (with addition of stock solutions) to pH 2 to 4, alternatively 2.5 to 3.5, which prevents iodine hydrolysis.

During the acidification process if sulfuric acid is used as the acid, the main reaction (1.) and secondary reactions (2.) and (3.) occur:

$$2NaI + H_2SO_4 = 2HI + NaSO_4 \quad (1.)$$

$$Ca(HCO_3)_2 + H_2SO_4 = CaSO_4 + 2CO_2 + 2H_2O \quad (2.)$$

$$2RCOONa + H_2SO_4 = 2RCOOH + Na_2SO_4 \quad (3.)$$

During acidification, the pH of the formation water may be kept within the range of 2.5 to 3.5. Acidification of the formation water may be performed in a horizontal cylindrical hollow unit (sludge collector) filled with a packing, in one of the ends of which the formation water and sulphuric acid are added.

Mixing of formation water with acid may occur in the process of their joint passing through the layer of packing. Acidified water may be removed from the other end [of the unit] through a side fitting.

The carbon dioxide which may be produced by acidification may be removed and released into the atmosphere and the solid particles may be filtered (precipitate) by the packing. Such a scheme of acidification of drilling water allows an even performance of this process.

Adding an Oxidizing Agent to the Equation Solution for Iodine Oxidation.

The oxidizing agent may be chlorine or chlorine water. It can be used in concentration rate from 1% to 20%; alternatively: from 5% to 15%; alternatively: around 10%.

In the drilling water, iodine is chemically bound in the form of HI or NaI. Oxidation of iodide ions to elementary iodine may be performed using chlorine water with the following reaction:

$$2I + Cl_2 I_2 + 2Cl \quad (4.)$$

Chlorine may also be used to oxidize organic compounds according to the following reaction:

$$R-Y+Cl_2 R-Cl+YCl \quad (5.)$$

If there is an excess of chlorine, the following reaction may occur:

$$I_2 + Cl_2 + 2Cl = 2ICl_2 \quad (6.)$$

$$I_2 = 5Cl_2 + 6H_2O = 2HIO_3 + 10HCl \quad (7.)$$

A careful measuring of chlorine dose at the oxidation stage may be necessary, because if there is lack of chlorine—iodine may be discharged along with the discharge water in form of iodide, and in case of excess—in the form of $ICl_2$ or $HIO_3$ (iodate).

Desorbing Iodine by Means of an Airflow

The desorbing may be carried out in a vertical column apparatus filled with a desorber packing. It can be propeller—crevice polyethylene packing.

The vertical column apparatus may have a height from 20 to 24 m, alternatively: from 12 to 15 m.

The desorber packing may be filled in bulk into the vertical column apparatus with a height from 12 to 13 m, alternatively: up to 7 m.

The vertical column apparatus may be made of titanium or fiberglass.

The temperature of airflow can be from 15 degr. C up to 40 degr. C; preferably: from 18 degr. C up to 30 degr. C; preferably: from 18 degr. C up to 25 degr. C. Airflow can be—of ambient temperature.

The desorbing may be carried out with an airflow rate in the range 105 to 200 m3/m3; alternatively: from 105 to 150 $m^3/m^3$, with respect to the total volume of the aqueous brine.

A density of water irrigation of the desorber packing may be from 20 to 80 $m^3/m^2$, alternatively 40 to 60 $m^3/m^2$, alternatively about 50 $m^3/m^2$, with respect to the vertical column apparatus cross-section square.

According to the invention disclosure, the ratio of air to the amount of formation oil water supplied to the desorption column ($G_M^3/L_M^3$) is of particular importance. Exact values are determined experimentally, after expiration of validity period, as it depends on "distribution coefficient" of iodine over formation oil water and temperature. For example: at temperature 40 degr. C its value=125 m3/1 m3; 45 degr. C, value=105 m3/1 m3 and at 50 degr. C, value=85 m3/1 m3.

The purpose of the desorption process is to extract the elementary iodine and may be carried out by means of an airflow in a vertical column apparatus (desorber) 12-15 meter high, made of titanium or fiberglass and filled up to 7 meters with a highly efficient packing.

The main indicator characterizing the efficiency of the iodine desorption process is the degree (%) of elementary iodine extraction. The degree of iodine extraction in the desorber depends on many factors: temperature of the heated formation water, [temperature of the] air, airflow rate, distribution of air and drilling water over the desorber section, type of packing, surface of the mass transfer ($m^2/m^3$) and the ratio of air to the amount of formation oil water supplied to the desorption column ($G_M^3/L_M^3$).

The density of water irrigation of the desorber packing may be about 50 $m^3/m^2$ of the desorber cross-section square. Airflow rate for the desorption of elementary iodine in the column depends on the temperature provided to the desorber, temperature of the water, and may be in the range from 105 to 150 $m^3/m^3$ of water.

This indicator depends on the coefficient of iodine distribution in the solution of drilling water, and is determined experimentally. The degree of desorption depends on the stage of iodine oxidation by chlorine and the mineralization of the formation water. The higher is mineralization of the drilling water—the higher airflow rate should be. The degree of iodine blow down (extraction) should be at least 95%.

The iodine—air mixture containing elementary iodine may be fed into the gas duct of an absorber to capture and bind elementary iodine. The desorption step may be considered most important one in the inventive method.

Adding a Sorbent for Chemisorbing the Iodine

The sorbent may be sodium hydroxide and/or mixture of iodine-hydrogen and sulfuric acids, but preferably—sodium hydroxide.

The sorbent may be used in an amount of 50 to 200 $g/dm^3$, alternatively 70 to 150 $g/dm^3$, alternatively 80-120 $g/dm^3$ with respect to the total volume of the aqueous brine.

As a sorbent for iodine binding, a solution of NaOH (sodium hydroxide) may be supplied to the absorber. In this case, the concentration of iodine in the sorbent may reach the value of 80-120 g/dm$^3$.

At this stage the following chemical reaction of iodine binding may occur:

$$3I_2 + 6NaOH \rightarrow 5NaI + NaIO_3 + 3H_2O \quad (8)$$

Additionally, carbon dioxide may partially be captured from a formation water during reaction (2) and supplied along with the air during the desorption step of iodine in the desorber.

$$2NaOH + CO_2 \rightarrow Na_2CO_3 + H_2O \quad (9)$$

$$Na_2CO_3 + CO_2 + H_2O \rightarrow 2NaHCO_3 \quad (10)$$

Crystallizing the Iodine

The crystallizing may be carried out in a crystallizer.

Crystallizer is used for purification of iodine from all harmful impurities and increasing of iodine purification (and concentration)

When iodine is formed in the crystallizer, the following reactions may occur:

$$5NaI + NaIO_3 + 3H_2SO_4 \rightarrow 3I_2 + 3Na_2SO_4 + 3H_2O \quad (11)$$

$$Na_2CO_3 + H_2SO_4 + Na_2CO_3 \rightarrow Na_4SO_4 + CO_2 + H_2O \quad (12)$$

$$2NaHCO_3 + H_2SO_4 \rightarrow Na_2SO_4 + 2CO_2 + H_2O \quad (13)$$

$$2NaOH + H_2SO_4 \rightarrow Na_2SO_4 + 2H_2O \quad (14)$$

The stock ("mother") solution may be fed to the sorbent collector and a crystallizer from which iodine in the form of iodine paste with a iodine content of up to 85% is fed through a filter to a Vacuum Nutsche Filter.

Purifying the Iodine Under a Layer of Sulfuric Acid

The purifying of the iodine under a layer of sulfuric acid may be carried out at a the temperature of 100 to 160° C., alternatively 110 to 150° C., alternatively 120-140° C.

The crystallized iodine may be transferred to a refining device under a layer of sulfuric acid. As a result of iodine melting in this device, iodine of AR grade (99.0%) is obtained or, in rare cases, of the LR grade (99.5%).

Sublimation of the Iodine

Besides, the commercial appearance of the received crystalline iodine, in the form of pieces, may not correspond to the modern requirements of consumers (scaled) and therefore the prices for lump iodine pieces of mark AR are considerably lower than the prices for scaled iodine of mark LR on the world market. Therefore, crystallized iodine obtained on the melting machine under the layer of sulfuric acid may be fed to a sublimation-desublimation machine, which produces the pharmacopoeia iodine of the LR grade.

The process of iodine sublimation is performed after the stage of its purification under a layer of sulfuric acid. In this case the iodine (85%) paste or the lump pieces of iodine (99.0), formed in the installation of iodine purification under a layer of sulfuric acid, may be used as the initial iodine for loading into the sublimator.

Unlike iodine paste, where the moisture content is ~15%, in crystallized (lump) iodine the moisture content may not exceed 0.8%, and therefore the process of sublimation and desublimation of iodine may be performed in one stage, which allows a twofold increase of capacity of the sublimation unit and producing of the scaled iodine, pharmacopoeia LR grade iodine with iodine content of 99.5 to 99.7%, in accordance with international standards.

Packaging of the Finished Product

The inventive method may further comprise a last step of packaging the finished product in plastic containers.

The object is further achieved by a reactor system for carrying out the inventive method:
a water heater;
a tank for storing an oxidizing agent;
means for carrying out iodine oxidation;
a desorber;
an absorption column;
a crystallizer;
an iodine melting node; and
a sublimator.

BRIEF DESCRIPTION OF THE DRAWING

FIG. 1 illustrates a reactor system for extracting iodine from an aqueous brine in accordance with an embodiment of the present invention.

Besides the constituents of the reactor system mentioned above, the reactor system may comprise further constituents, for example piping or a piping system for connecting the individual parts of the reactor system, an oil well for producing a flow of aqueous brine which is located upstream of the reactor system, further tanks for storing chemicals necessary or useful for carrying out the process, pumps, connection parts etc. A variety of different further constituents is described below with respect to the specific examples with reference to FIG. 1. However, the person skilled in the art will understand that not all constituents shown in FIG. 1 may necessarily be used and that the constituents shown in FIG. 1 may partly be substituted by equivalent means.

DETAILED DESCRIPTION OF THE INVENTION

In the following, the present application will be described in detail with reference to the FIGURE (drawing). It shall, however, be understood that not all of the preferred features mentioned in the following are necessarily needed for building an inventive device. Rather, one or more of the following preferred features may, separately or in combination, be used, in particular in combination with the above general disclosure of the invention, to realize the inventive method.

In the reactor system shown in FIG. 1 initial iodine-containing formation water (aqueous brine) is fed into separators of oil and water 1, where, after the separation of oil and solid impurities, it is supplied to the inlet of a water heater 2, where the aqueous brine is heated to a temperature of 45 to 50° C. and is pumped into a raw water tank 3.

Then the aqueous brine flows through a 1.5 m diameter fiberglass pipe—sludge collector 9 to a pump inlet 4 and afterwards to the top of a desorber 5 for irrigation of the desorber packing. Before the aqueous brine enters the desorber, the following parts are added to it: iodine stock solution from a tank 6, concentrated sulfuric acid for achieving a pH from 2.0 to 2.5, concentrated sulfuric acid, and chlorine water from an electrolyzer 8 for iodine oxidation.

Acidified and oxidized oil formation water containing iodine ions goes to the top of the desorber 5 and is evenly distributed over the active section of the column using irrigators. Flows of acidified and oxidized iodine-containing oil water flows down packing 10 and 11 while spreading into individual thin streams. An airflow is blown forming a counter-flow from bottom to the top using a fan 12 with a speed of 1.7-1.85 m/sec against the water streams containing elementary iodine. In the course of this process takes place the desorption (transition) by air of elementary iodine from oil water into gaseous phase through the packing layer. The desorber 5 is a vertical cylindrical device made of titanium with an internal diameter of 2.0 to 3.4 m and a height of 12 to 15 m filled up to 5 m (height) and 2 m (diameter) respectively with a highly effective packing.

The efficiency of the iodine desorption process depends on the specific surface of the packing used in the desorber, the temperature of the drilling water and the amount of air supplied for iodine blowing. Acidified and oxidized iodine-containing formation water is depleted from iodine as it flows down the packing, and the air supplied from the bottom to the top of the desorption column is enriched with iodine vapor as it rises to the top of the desorption column.

After iodine extraction, the spent acidified formation water is removed from the lower part of the desorption column through a hydrosealing device that prevents the air from escaping, and then goes to a unit 13 for its neutralization by alkaline solution from the electrolyzer 8 and by lime milk (calcium oxide—CaO) supplied to the neutralizing unit 13 until it reaches the value of pH=7.0 to 7.5. Afterwards, the treated and neutralized formation water is sent back to the plant for utilization of formation oil waters with further pumping of these waters into the absorbing horizons of oil wells.

The iodine/air mixture from the top of the desorber 5 flows through a duct 14 to the bottom of the absorber 15 and spreads in the process of its passing through the grate and packing 16, then it is directed to the upper part of the absorption column 15. Against the iodine-air mixture—from top to the bottom—absorbent flows down (sodium-hydroxide solution) from the sorbent circulation tank 17, by means of a centrifugal pump 18 to the absorption column irrigator. Chemisorption processes take place on the surface of the packing between iodine and sodium hydroxide solutions. The design of the absorber is similar to that of the desorber and differs only in the height of the column—9 to 10 m and the height of the packing (5 m). As the sorbent flows down, the sorbent is enriched with iodine and iodate (the total iodine content), and the iodine gets extracted from the air as it rises up the column. After iodine has been extracted (captured) from it, the air escapes to the atmosphere through an exhaust pipe 19.

The sorbent solution is continuously circulating as per the following scheme:

K-15->E-17->K-15->E-17

As the iodine sorbent circulates, it is continuously enriched with iodine, i.e. the concentration of iodide $I^-$ and iodate $IO_3^-$ ions increases, and the content of sodium hydroxide accordingly decreases.

Lack of sodium hydroxide is compensated by the addition of a sorbent. For normal operation, the pH of the sorbent should be maintained within 9 to 11. After reaching the concentration of general iodine to 80-120 g/l, the basic part of a sorbent is gradually removed to the crystallizer 19 where the fresh water is continuously supplied from the tank for the purposes of cooling and rinsing.

When concentrated sulphuric acid and chlorine are continuously added from the tank 19, iodine paste gets extracted, which is fed to the Nutsche Filter 20 and then sent to the iodine melting node under the layer of sulphuric acid 21 or to the iodine sublimator 22 and then for its package 23.

In order to reduce sulfuric acid consumption, the spent stock solution after the Nutsche Filter 20 is fed to the stock solution receiving tank 6 and then added through the pipeline to iodine-containing water supply to the desorber 5. The iodine paste obtained through the filter is rinsed with the fresh water in the volume equal to the weight of the rinsed iodine (1 kg—1 liter of water) and then dried by suction of air through the iodine paste layer with a vacuum pump.

The refining device (iodine melter) 21 operates at a the temperature of 120 to 140° C. The temperature is maintained using four 1.5 kW heaters. Temperature control is maintained automatically using contact thermometers. Concentrated sulfuric acid and iodine paste are supplied from above. The acid is supplied from the pressure tank 7 with the force of gravity and the iodine paste is loaded manually.

Refined iodine is removed from the bottom of the unit through the packing, preventing the ingress of sulfuric acid into the finished product. Waste acid is removed from the side outlet and then used to acidify the initial water. Refined iodine is collected in the finished product collector units made of PTFE.

Iodine extracted to the collector units is then crushed and packaged per 50 kg into the drums with inserts made of polyethylene terephthalate film. The iodine is then fed into the unit 22 for the purpose of obtaining sublimated iodine and, after drying, is then fed to the packaging machines 23. The sublimated or technical iodine obtained shall conform the international standards in terms of its composition and package and shall be distributed in the following packages: 50 kg, 10 kg, 3 kg, 0.5 kg.

This technology of iodine production is modern, low-waste and ecologically safe. Waste acidic water from desorber is discharged to a reactor with a stirring device 13, into which the lime milk and alkali from the electrolyzer 8 are fed. Discharge water, after its neutralization with lime milk and alkali to pH 7.0 goes into waste water collector 26 and is then pumped into the waste oil formation water reservoirs.

In order to prevent harmful emissions of iodine vapor formed at the stages of crystallization, purification (sublimation) and scaling from escaping into the atmosphere, those emissions are driven by a fan 24 to the scrubbing packing 25 where the emissions are captured by a liquid absorber pumped 28 from the tank 27. The yield of the finished product (iodine of AR or LR) using this technology is 85 to 88%.

The features disclosed in the foregoing description, in the claims and the accompanying drawings may, both separately or in any combination, be material for realizing the invention in diverse forms thereof.

The invention claimed is:

1. Reactor system for extracting iodine from an aqueous brine, comprising:
   a water heater (2) configured to heat the aqueous brine;
   a desorber (5) connected with the water heater by a connection that is configured to transfer the heated aqueous brine from the water heater (2) downstream to the desorber (5);
   a tank configured to store an oxidizing agent (6), the tank being configured to provide a supply of the oxidizing agent into the aqueous brine in the connection upstream of the desorber;
   an electrolyzer (8) configured to provide chlorine water, the electrolyzer configured to provide a supply of the chlorine water into the aqueous brine in the connection upstream of the desorber;
   the desorber (5) being configured to desorb iodine from the aqueous brine using an airflow to form a gas containing the desorbed iodine;
   an absorption column (15) arranged downstream of the desorber, the absorption column being configured to receive the gas containing the desorbed iodine and being configured to chemisorb the desorbed iodine contained in the gas to form a chemisorbed iodine;

a crystallizer (19) arranged downstream of the absorption column, the crystallizer being configured to receive iodine extracted from the chemisorbed iodine and being configured to crystallize the extracted iodine;

an iodine melting node (21) arranged downstream of the crystallizer, the iodine melting node being configured to receive the crystallized iodine and being configured to refine the crystallized iodine; and a sublimator (22) arranged downstream of the iodine melting node, the sublimator being configured to receive the refined iodine and being configured to sublime the refined iodine;

wherein the desorber (5) is a vertical column apparatus filled with a desorber packing;

the desorber packing is polyethylene packing;

the vertical column apparatus has a height from 20 to 24 m or from 12 to 15 m;

the vertical column apparatus is made of titanium or fiberglass;

the desorber (5) is configured to provide the airflow such that the airflow is blown from a bottom to a top of the vertical column apparatus;

the desorber (5) is configured such that a rate of the airflow in the desorber is in a range from 105 to 200 $m^3/m^3$, with respect to a volume of the aqueous brine in the desorber;

the desorber is configured such that a volume of water irrigation in the desorber packing with respect to a cross-sectional square of the vertical column apparatus is in a range from 40 $m^3/m^2$ to 60 $m^3/m^2$; and the desorber is configured such that a temperature of the airflow is in a range from 15° C. to 40° C.

2. Reactor system according to claim 1, wherein the water heater (2) is configured to operate at a temperature from 45 to 50° C.

3. Reactor system according to claim 1, wherein the oxidizing agent is chlorine or chlorine water.

4. Reactor system according to claim 1, wherein the desorber packing is propeller shaped.

5. Reactor system according to claim 1, wherein sorbent in the absorption column (15) is sodium hydroxide and/or iodine-hydrogen and sulfuric acids.

6. Reactor system according to claim 1, wherein the absorption column (15) is configured to provide sorbent in an amount of 50 to 200 $g/dm^3$ with respect to the total volume of the aqueous brine in the absorption column.

7. Reactor system according to claim 1, wherein the absorption column (15) has a height from 9 to 10 m.

8. Reactor system according to claim 1, wherein the iodine melting node (21) is configured to operate at a temperature of 100 to 160° C.

9. Reactor system according to claim 1, wherein the iodine melting node (21) is positioned under a layer of sulfuric acid.

10. Reactor system according to claim 1, wherein a store of an acid is provided upstream of the desorber for being added to the aqueous brine to arrive at a pH value from 2 to 4 before the aqueous brined enters the desorber (5).

11. Reactor system according to claim 1, wherein the desorber is configured such that an amount of the desorbed iodine contained in the gas and blown through the vertical column apparatus is at least 95% with respect to a total amount of iodine contained in the aqueous brine added into the vertical column apparatus.

* * * * *